(12) United States Patent
Gundogan et al.

(10) Patent No.: US 12,301,311 B2
(45) Date of Patent: May 13, 2025

(54) PANEL PRIORITIZATION FOR MULTI PANEL USER EQUIPMENT

(71) Applicant: Nokia Solutions and Networks Oy, Espoo (FI)

(72) Inventors: Alperen Gundogan, Munich (DE); Janne Ali-Tolppa, Pirkkala (FI); Anna Pantelidou, Antony (FR); Christian Rom, Aalborg (DK)

(73) Assignee: Nokia Solutions & Networks Oy, Espoo (FI)

(*) Notice: Subject to any disclaimer, the term of this patent is extended or adjusted under 35 U.S.C. 154(b) by 50 days.

(21) Appl. No.: 18/374,045

(22) Filed: Sep. 28, 2023

(65) Prior Publication Data

US 2024/0113749 A1  Apr. 4, 2024

(30) Foreign Application Priority Data

Sep. 30, 2022  (FI) .................................. 20225877

(51) Int. Cl.
*H04B 7/0408* (2017.01)
*H04B 7/06* (2006.01)
*H04L 5/00* (2006.01)

(52) U.S. Cl.
CPC ......... *H04B 7/0408* (2013.01); *H04B 7/0617* (2013.01); *H04L 5/0048* (2013.01)

(58) Field of Classification Search
CPC .... H04B 7/0408; H04B 7/0617; H04L 5/0048
See application file for complete search history.

(56) References Cited

U.S. PATENT DOCUMENTS

2022/0046447 A1  2/2022  Pedersen et al.

FOREIGN PATENT DOCUMENTS

| WO | WO-2021/176703 A1 | 9/2021 |
| WO | WO 2022/031450 A1 | 2/2022 |
| WO | WO 2022/096543 A1 | 5/2022 |

OTHER PUBLICATIONS

LG Electronics, "Feature lead summary#3 of Enhancements on Multi-beam Operations," 3GPP TSG RAN WG1 Meeting #97, R1-1907860, Reno, USA, May 13-17, 2019.
"Discussion on multi-beam enhancement", vivo, 3GPP TSG RAN WG1 #102-e, R1-2005363, Aug. 2020, 21 pages.

*Primary Examiner* — Sophia Vlahos
(74) *Attorney, Agent, or Firm* — McCarter & English LLP

(57) ABSTRACT

A method including: receiving, by a multi-panel user equipment from a serving network entity, information indicative of predicted transmissions of reference signals by a serving network entity or target network entity; and applying a panel prioritization strategy for the multi-panel user equipment based on the received information indicative of predicted transmissions of reference signals.

13 Claims, 10 Drawing Sheets

Sending a request to a serving network entity to receive information indicative of predicted transmissions of reference signals  ~910

Receiving information indicative of predicted transmissions of reference signals by a serving network entity or target network entity  ~920

Applying a panel prioritization strategy for the multi-panel user equipment  ~930

PANEL PRIORITIZATION FOR MULTI PANEL USER EQUIPMENT

TECHNICAL FIELD

Various example embodiments relate generally to apparatus, method, and computer program for determining a panel prioritization strategy.

BACKGROUND

Network energy saving is of great importance for environmental sustainability, to reduce environmental impact (greenhouse gas emissions), and for operational cost savings. As 5G (fifth generation) network is becoming pervasive across industries and geographical areas, handling more advanced services and applications requiring very high data rates (e.g. XR), networks are being denser, use more antennas, larger bandwidths and more frequency bands. The environmental impact of 5G needs to stay under control, and novel solutions to improve network energy savings need to be developed.

3GPP Technical Report TR 37.817 V17.0.0 (2022 April) discloses use cases and solutions using Artificial Intelligence/Machine Learning (AI/ML) in RAN for network energy saving. To meet the 5G network requirements of key performance and the demands of the unprecedented growth of the mobile subscribers, millions of base stations are deployed.

Radio cell activation/deactivation is an energy saving scheme in the spatial domain that exploits traffic offloading in a layered structure to reduce the energy consumption of the whole radio access network (RAN). When the expected traffic volume is lower than a fixed threshold, the radio cells may be switched off, and the served User Equipments (UEs) may be offloaded to a new target radio cell.

Efficient energy consumption can also be achieved by other means such as reduction of load, coverage modification, or other RAN configuration adjustments. The optimal energy saving decisions depends on many factors including the load situation at different RAN nodes, RAN nodes capabilities, KPI/QoS requirements, number of active Ues and UE mobility, radio cell utilization, etc.

However, the identification of actions aimed at energy efficiency improvements is not a trivial task. Wrong switch-off of the radio cells may seriously deteriorate the network performance since the remaining active radio cells need to serve the additional traffic. Wrong traffic offload actions may lead to a deterioration of energy efficiency instead of an improvement.

ML techniques could be used to optimize the energy saving decisions by leveraging on the data collected in the RAN network. ML algorithms may predict the energy efficiency and load state of the next period, which can be used to make better decisions on radio cell activation/deactivation for energy saving. Based on the predicted load, the system may dynamically configure the energy-saving strategy (e.g., the switch-off timing and granularity, offloading actions) to keep a balance between system performance and energy efficiency and to reduce the energy consumption.

However the impacts of the energy saving strategies on the served UEs and/or the potentially served UEs, for example a UE for which a handover process is pending, have not been addressed in a satisfying manner.

SUMMARY

The scope of protection is set out by the independent claims. The embodiments, examples, and features, if any, described in this specification that do not fall under the scope of the protection are to be interpreted as examples useful for understanding the various embodiments and examples that fall under the scope of protection.

According to a first aspect, there is provided a method comprising receiving, by a multi-panel user equipment from a serving network entity, information indicative of predicted transmissions of reference signals by a serving network entity or target network entity; applying a panel prioritization strategy for the multi-panel user equipment based on the received information indicative of predicted transmissions of reference signals.

The panel prioritization strategy may be applied for a time period included within a validity period of the received predicted energy saving strategy.

The information indicative of predicted transmissions of reference signals may be received in a Radio Resource Control, RRC, reconfiguration message during an inter-radio cell mobility procedure.

The information indicative of predicted transmissions of reference signals may be received in a medium access control, MAC, control element, CE, message during a beam management procedure to switch from a serving beam corresponding to a first reference signal transmitted by the serving network entity to a target beam corresponding to a second reference signal transmitted by the serving network entity.

The information indicative of predicted transmissions of reference signals may include at least one predicted activation status of a reference signal. The information indicative of predicted transmissions of reference signals may include at least one probability of transmission of a reference signal.

Applying a panel prioritization strategy may include determining an activation rate for at least one panel of a plurality of panels of the multi-panel user equipment. An activation rate of a panel may be adjusted in various manners. The activation rate of a panel configured to detect a first reference signal for which the predicted activation status indicates that the first reference signal will be sent during a next time period may be higher than the activation rate of a panel configured to detect a second reference signal for which the predicted activation status indicates that the second reference signal will not be sent. The activation rate of a first panel configured to detect a first reference signal is higher than the activation rate of a second panel configured to detect a second reference signal when the probability of transmission of the first reference signal may be higher than the probability of transmission of the second reference signal. Applying a panel prioritization strategy may include: applying the activation rate to at least one panel of a plurality of panels of the multi-panel user equipment.

The method may comprise: sending a request to the network entity to receive information indicative of predicted transmissions of reference signals for a serving radio cell and/or a target radio cell.

According to another aspect, there is provided an apparatus comprising at least one processor; at least one memory storing instructions that, when executed by the at least one processor, cause the apparatus to perform: receiving, from a serving network entity, information indicative of predicted transmissions of reference signals by a serving network entity or target network entity; and determining a panel prioritization strategy based on the received information indicative of predicted transmissions of reference signals.

Generally, the apparatus comprises means for performing one or more or all steps of a method disclosed herein, for example a method according to the first aspect. The means may include circuitry configured to perform one or more or all steps of the method. The means may include at least one processor and at least one memory storing instructions that, when executed by the at least one processor, cause the apparatus to perform one or more or all steps of the method.

According to another aspect, there is provided a non-transitory computer-readable medium storing program instructions that, when executed by an apparatus, cause the apparatus to perform a method disclosed herein, for example a method according to the first aspect

BRIEF DESCRIPTION OF THE DRAWINGS

The accompanying drawings, which are incorporated in and constitute a part of this specification, illustrate example embodiments together with the general description given above, and the detailed description given below.

Figure 1:
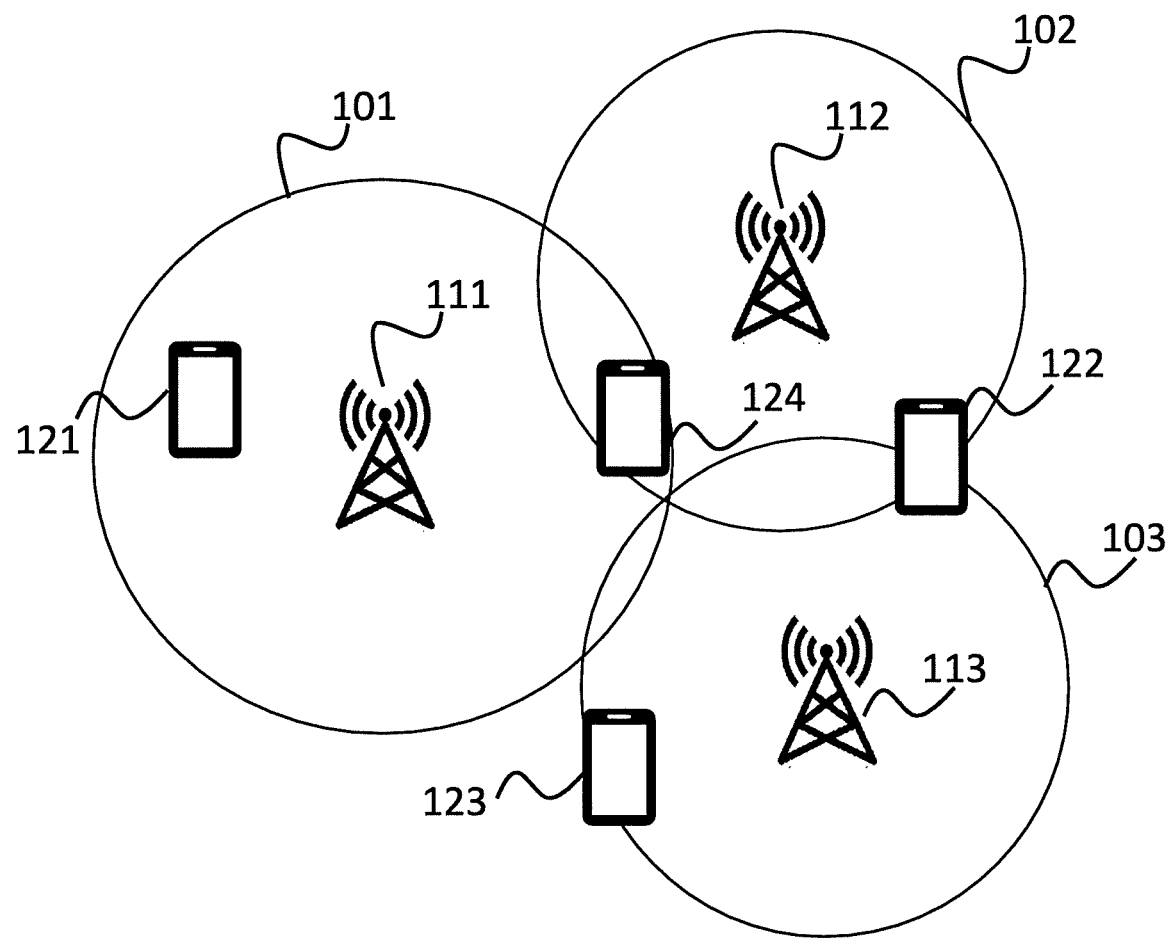
FIG. 1 is a schematic diagram of a communication system according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

Several embodiments relate to an apparatus, a method, and computer program for determining a panel prioritization strategy by a multi-panel user equipment (MPUE).

To meet the 5G network requirements of key performance and the demands of the unprecedented growth of the mobile subscribers, millions of base stations (BSs) are being deployed. Such rapid growth brings the issues of high energy consumption. Therefore, energy saving is an important aspect. Radio cell activation/deactivation is an energy saving scheme in the spatial domain that exploits traffic offloading in a layered structure to reduce the energy consumption of the whole radio access network (RAN). When the expected traffic volume is lower than a fixed threshold, the radio cells may be switched off, and the served UEs may be offloaded to a new target radio cell.

The decisions related to the energy saving strategy of the network may be predicted using an AI/ML-based network energy saving model.

According to 3GPP document TR 37.817, the training of the network energy saving model for energy saving predictions may be located in the OAM function or in the gNB and the model inference may be located for example in one or more NG-RAN nodes. The NG-RAN node may execute one or more network energy saving actions according to the model inference output. The NG-RAN node may select the most appropriate target radio cell for each UE before the UE performs handover, if the output concerns the handover strategy.

Accordingly, a NG-RAN node (a source node or target node) can determine a network energy saving strategy. The energy saving strategy is used for example to decide whether to activate or not a radio cell and/or whether to transmit or not reference signals used to synchronize the UEs with an access node of the radio cell.

It is here proposed to transmit, to one or more UEs, information generated by the network energy saving model that relates to the transmissions of reference signals by a network entity (e.g. an access node) for a given radio cell. The information related to the transmissions of reference signals may be information indicative of predicted transmissions of reference signals by a network entity.

The information indicative of predicted transmissions of reference signals may include for example for each of one or more reference signal: at least one predicted activation (or deactivation) status of the concerned reference signal and/or at least one probability of transmission of the concerned reference signal.

The MPUE may determine a panel prioritization strategy for a multi-panel user equipment based on the received information. For example the MPUE may prioritize the activation of the one or more panels that are configured to detect reference signals with a high probability of transmission or that, based on the activation/deactivation status predicted by the network energy saving model, will be transmitted. This avoids unnecessary panel activation to detect reference signals that will not be transmitted and saves energy of the UE.

The information indicative of predicted transmissions of reference signals may be transmitted at various appropriate times. The information may be transmitted during an inter-radio cell mobility procedure from a serving radio cell to a target radio cell. The information may be transmitted during a beam management procedure in which a UE determines (e.g. based on quality measurements) whether to switch from a serving beam to a target beam. The information indicative of predicted transmissions of reference signals may be transmitted on request from the UE.

A network entity sending reference signals for a radio cell may be an access node associated with the radio cell, e.g. that is configured to manage (e.g. control, configure, etc) access to a network through the radio cell. The network entity may be a serving network entity associated with a serving radio cell or a target network entity associated with a target radio cell in the context of an inter-radio cell mobility procedure.

Without this information indicative of predicted transmissions of reference signals, the UE may perform unnecessary panel activations for the radio cells and/or beams which can be switched off in future. The UE may also perform unnecessary panel activations to perform quality measurements for radio cells and/or beams that could be switched off in future. Unnecessary panel activation increases the power consumption of the MPUE. At the same time may decrease the measurement accuracy for the radio cells and/or beams that are the potential target radio cells and/or beams for the MPUE that can activate only one UE at a time. The decrease the measurement accuracy may itself cause other problems like inter-radio cell mobility procedure failures, higher service interruption time during mobility procedure, unnecessary signalling, etc.

FIG. 1 represents in a simplified manner a radio telecommunication system 100 including several radio cells 101, 102, 103, each radio cell being managed by a corresponding access node 111, 112, 113. A user equipment (UE) 121, 122, 123, 124, may be operatively connected with one or more access nodes 111, 112, 113.

Examples of radio telecommunication systems may include a fifth generation (5G) network using the 5G NR (New Radio) as radio access technology (RAT) as defined by 3GPP or 6G network. Prior or subsequent generations of radio telecommunication systems may be concerned by the energy saving strategies and panel activation strategies disclosed herein.

An access node 111, 112, 113 may be a base station (eNB, gNB, gNB-DU, gNB-CU, etc). At least part of the functionalities of the access node may also be carried out by a network entity (like a network node, a server, a host device, a host system) which is operably coupled to a transceiver (such as a remote radio head for example) and which includes other functions (such as an OAM function or another network function that may be used for implementing features in a NWDAF, Network Data Analytics Function, etc).

A user equipment, UE, (or user terminal, user device) 121, 122, 123, 124 may refer to a portable computing device that includes wireless mobile communication devices operating with or without a subscriber identification module (SIM), including, but not limited to, the following types of devices: a mobile station (MS), a mobile phone, a radio cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples.

A UE may simultaneously transmit and receive using one or more antenna panels depending on the hardware architecture.

A panel may correspond to a mm-Wave antenna module. A panel consists of one or several physical antenna elements. A panel has an associated RF architecture that enables the control of a steerable radiation pattern associated with the panel. This architecture may include several components: a power amplifier (PA), a low noise amplifier (LNA), a phase shifter (PS) per antenna element from which the signals can be combined to a single signal with common properties from all the elements in a panel. Panel activation/deactivation relates to powering ON/OFF the active components of the RF architecture such as the PA/LNA/PS.

Figure 2:
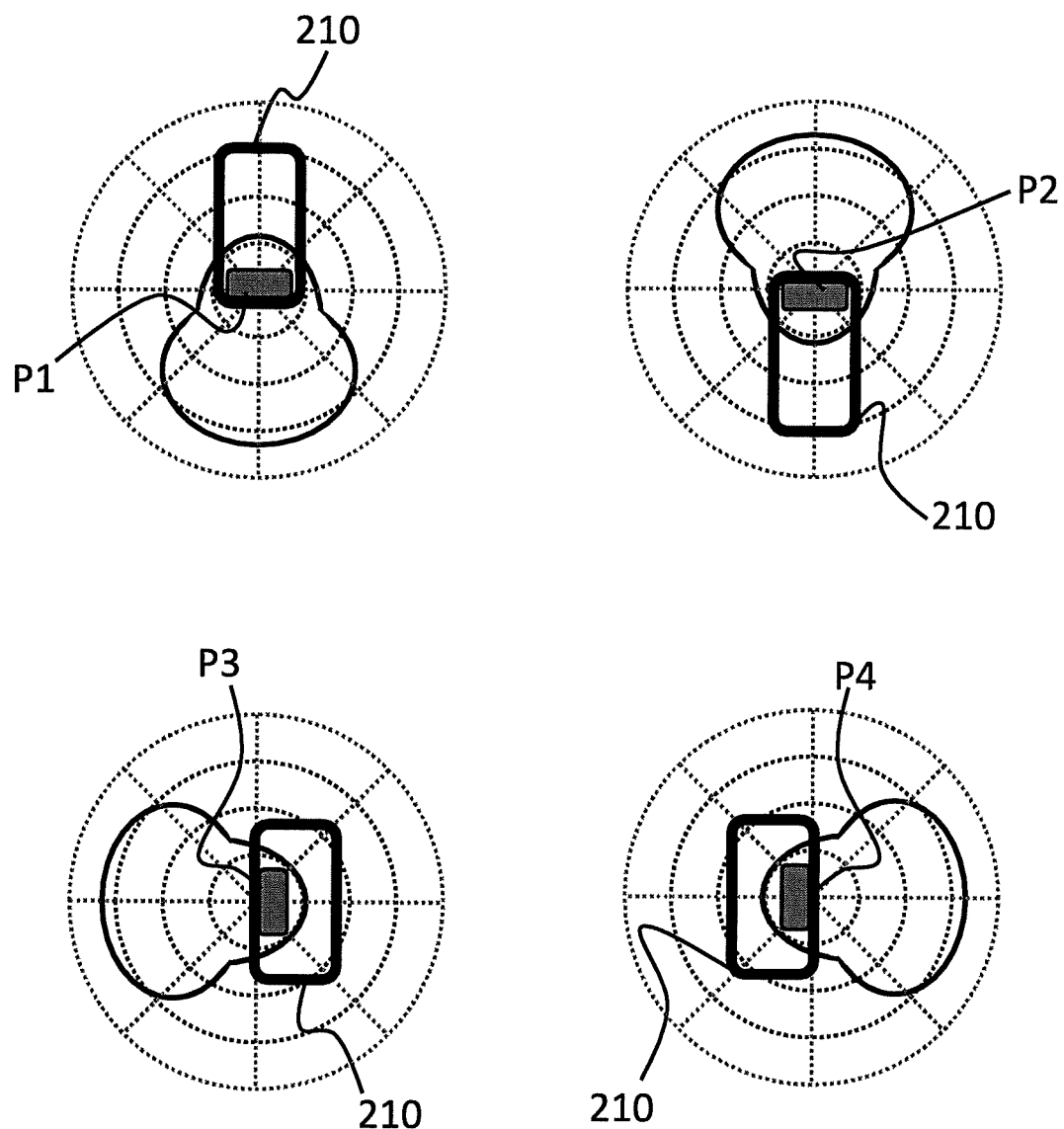
FIG. 2 shows an example configuration of a MPUE.

FIG. 2 illustrates an example configuration of a MPUE.

A panel is configured to receive and transmit signals in a given direction range and with a given spatial coverage. For example a MPUE may include 4 panels: an upper panel P1 to receive and transmit upward; a bottom panel P2 to receive and transmit downward; a right panel P3 to receive and transmit rightward; and a left panel P4 to receive and transmit in leftward. Panels could also be placed in the back of the MPUE oriented the same way as the main camera or in the front of the phone oriented pointing in the same direction as the secondary "selfie" camera of the phone.

The reference signals for which information indicative of predicted transmissions of reference signals are transmitted to a UE may be any type of reference signal transmitted between a serving network entity and a user equipment. A reference signal may be a synchronization signal. In the context of 5G radio networks, a reference signal is for example a SSB-RS (Synchronization Signal Block Reference Signal); CSI-RS (Channel State Information Reference Signal); DMRS (DeModulation Reference Signal); PTRS (Phase Tracking Reference signal); etc.

As an example in 3GPP 5G NR standards, the user equipment synchronizes with a base station on the basis of a reference signal SSB-RS including SSB, also called SS block or SS/PBCH block. A SSB includes a MIB (Master Information Block) that is a basic system information. A UE uses the SSBs (Synchronization Signal Blocks) to synchronize with a base station of a radio cell and decode the Master Information Block (MIB). The base station transmits a plurality of SSBs in a plurality of time slots, with for example two SSBs per time slot. Each SSB has an associated index for ordering. The MIB included in one SSB includes the index of said SS block. The SSBs are usually located at two known (fixed) SSB candidate positions in a time slot. The SSB candidate (possible) positions in a time slot are given by 3GPP 5G NR standards.

In order to carry out the synchronization, the user equipment has to first detect one SSB. The detected SSB may depend on the user equipment location in a radio cell covered by the base station, where different SSB indices correspond to different directions for example. Once the user equipment has detected one SSB index, the user equipment starts to perform the synchronization process. For that purpose, the user equipment reads the MIB in the detected SSB and obtains the SSB index.

Figure 3:
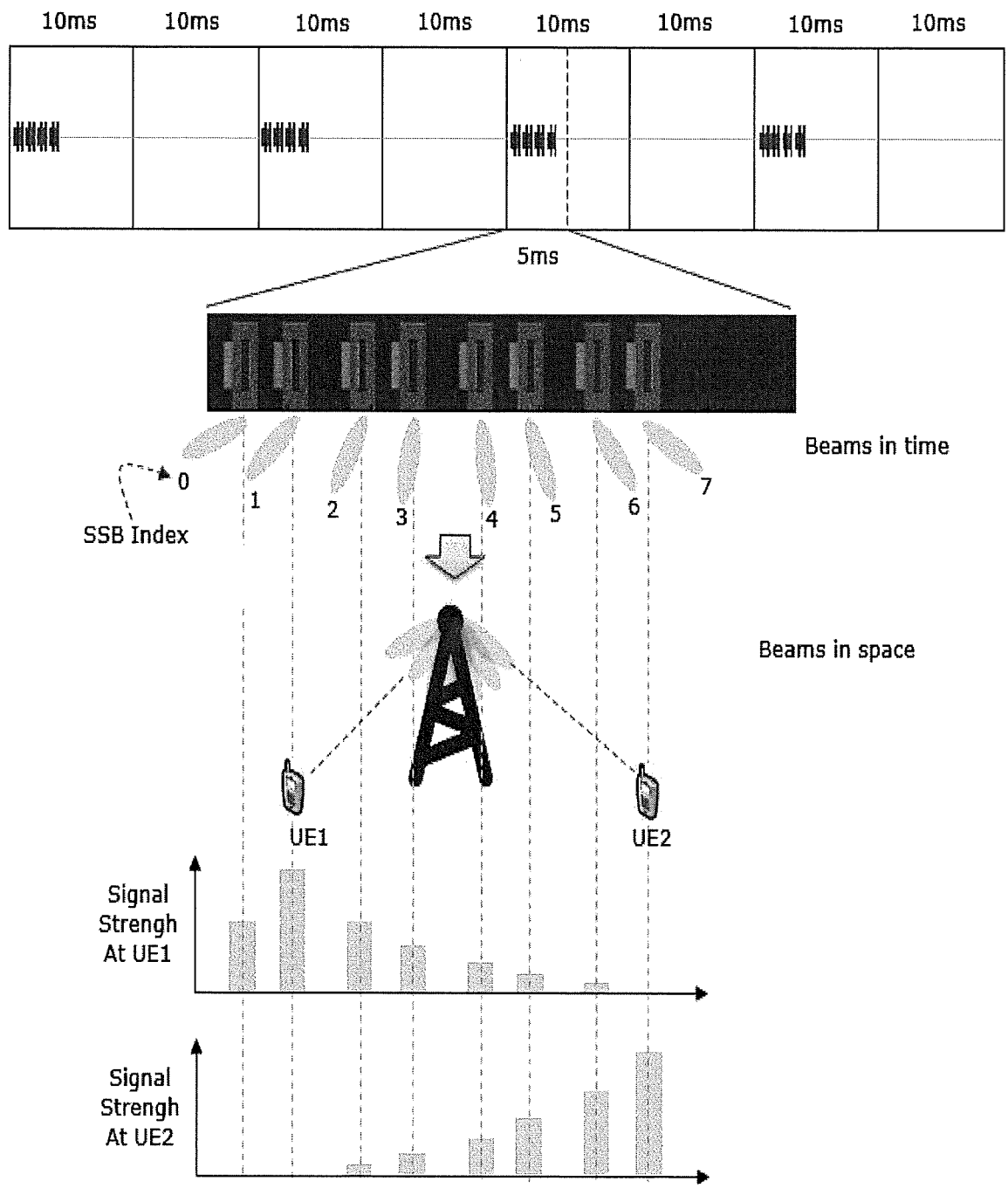
FIG. 3 illustrates aspects related to the use of reference signals according to an example.

FIG. 3 illustrates SS bursts, beam pattern and UE measurements for two distinct UEs UE1, UE2.

A SSB includes a Primary Synchronization Signal (PSS), Secondary Synchronization Signal (SSS), Physical Broadcast Channel (PBCH). SS burst sets are defined to enable beam-sweeping. A SS burst includes a set of SSBs, where each SSB may be transmitted on a different beam. The UE performs measurements on the different beams in the SS burst to determine the right beam configuration for data transmission.

As illustrated by FIG. 3, during a time period of 5 ms within a time slot of 10 ms, a SS burst including a set of 8 beams with distinct indexes 0 to 7 is emitted by a base station. The transmission pattern of the SSBs (SSB temporal positions in burst and the periodicity of the SS burst) is sent to the UE via a signal RRC IE (Radio Resource Control Information Element) in SIB1 (System Information Block Type1). Each UE measures the signal strength for each beam. As illustrated by FIG. 3, depending on UE position with respect to the base station the signal strength measured for the SSBs in a burst may vary and UE1 may select a different beam to synchronize with the base station.

For a UE with a multi-panel antenna the capacity to detect a SSB-RS depends on the MPUE hardware and the panel activation strategy. MPUE hardware categories are classified in 3 categories in 3GPP Document R1-1907860 (See 3GPP TSG RAN WG1 Meeting #97, R1-1907860, Reno, USA, May 13-17, 2019): MPUE-Assumptions 1 to 3.

Figure 5:
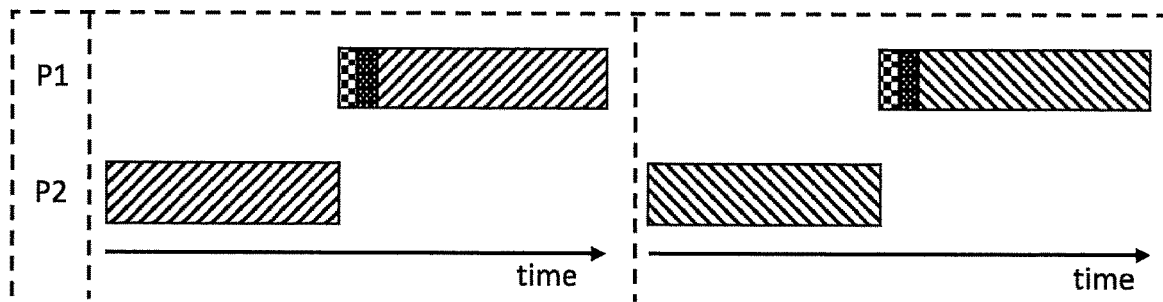
FIG. 5 illustrates relationships between a panel activation strategy and a network energy saving strategy according to an example.
Figure 5:
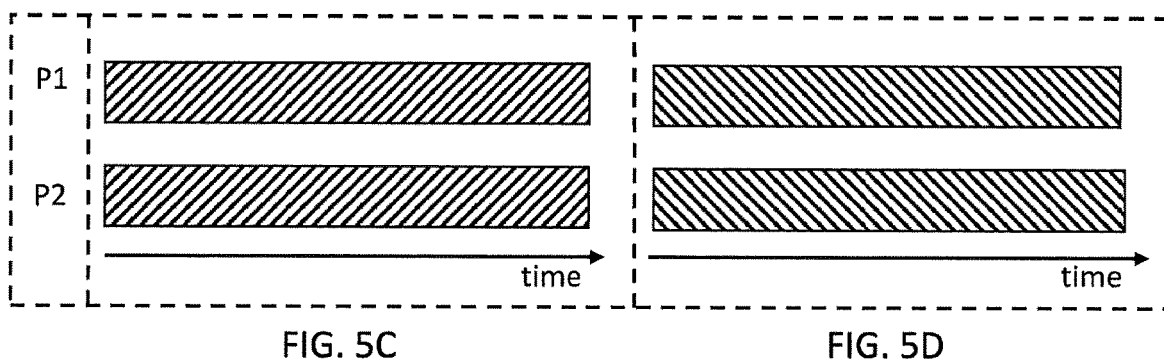
Figure 5:
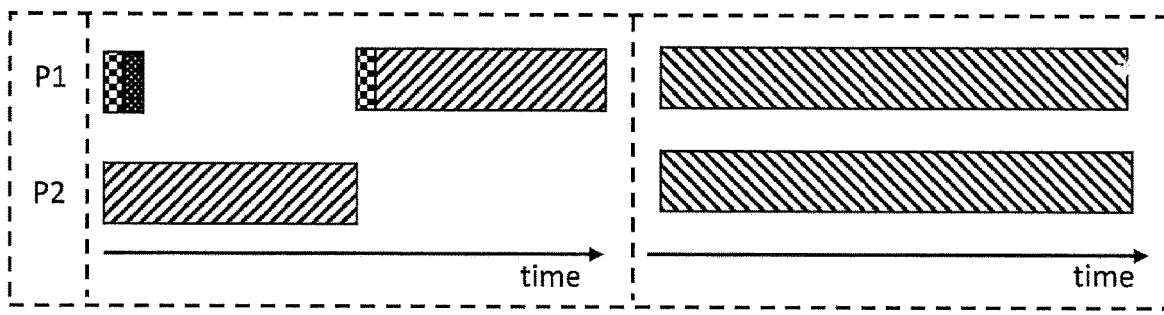

FIG. 5 illustrates for these 3 categories the activation periods, measurement periods and for transmission and/or reception periods for panels of a multi-panels antenna. For simplification reasons, only the case with two panels is illustrated here but it can be generalized to any number of panels. The left-hand side parts 5A, 5C, 5E of this figure corresponds to activation of panel(s) for transmission (uplink) and the right-hand side parts 5B, 5D, 5F corresponds to activation of panel(s) for reception (downlink).

However, the hardware architecture implementations of a Multi-Panel User Equipment (MPUE) may result in different UE capabilities and power consumption levels.

The first category (MPUE-Assumption 1) corresponds to cases in which multiple panels are implemented on a UE and only one panel can be activated at a time (e.g. for UL and DL). See FIGS. 5A-5B. In this case the UE includes multiple antenna panels but only a single baseband processing chain configured to measure SSBs on each of them. This requires that the UE follows a panel switching schedule, i.e., the UE switches the BB-to-RF panel connection one SSB burst at a time. In such cases, the activation and switching of a panel may introduce a switching delay of few (e.g., 3) ms.

The second category (MPUE-Assumption 2) corresponds to cases in which multiple panels are implemented on a UE and multiple panels can be activated at the same time and one or more panels can be used for transmission (FIG. 5C) and reception (FIG. 5D).

The third category (MPUE-Assumption 3) corresponds to cases in which multiple panels are implemented on a UE and multiple panels can be activated at the same time for reception and measurements, since each panel has its own baseband processing chain, but only one panel can be used for transmission. See FIGS. 5E-5F.

In a baseline architecture based on MPUE-assumption 1, a UE can only have one panel active per time-instant and thus MPUE may need more time to obtain reliable measurements (e.g. RSRP, Reference Signal Received Power or RSRQ, Reference Signal Received Quality) as only one panel is active at a time. The activation of a panel is UE implementation specific and may happen for example in round-robin fashion.

In many cases for MPUE-Assumption 1, the MPUE has several panels connected to a single baseband processing chain via a BB-to-RF module. This means that most likely the RF module would be switched on early to allow for a quasi-instantaneous switch of panel. Therefore, the duration of activation and measurement may vary based on RF module design. Note that, the main limitation of assumption 1 is to have single transceiver and mm-Wave baseband digital unit with only a single Tx chain and two Rx chains (one per polarization)

Figure 4:
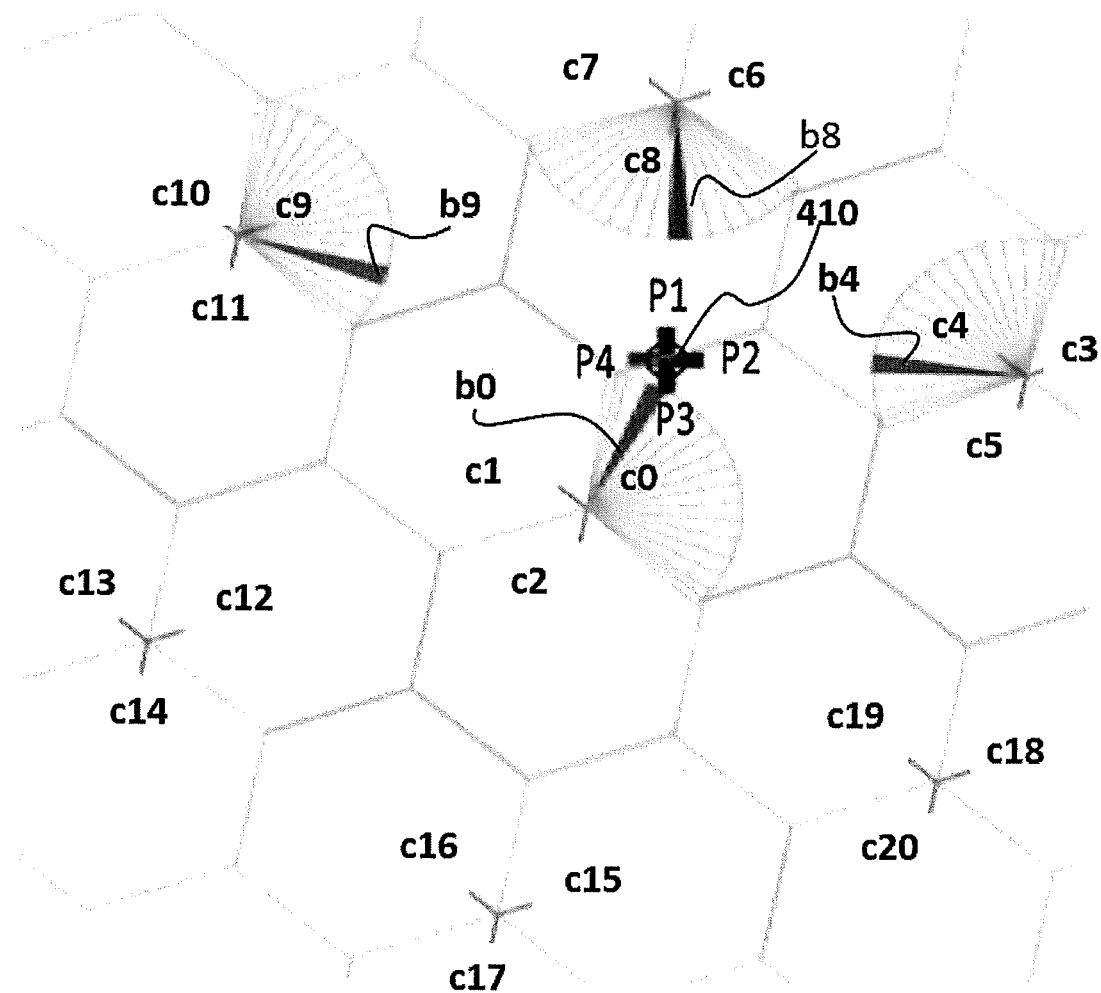
FIG. 4 illustrates MPUE hardware categories.

FIG. 4 illustrates how problems may arise when a MPUE is not aware of the predicted network energy saving strategy that relates to the transmissions of reference signals.

FIG. 4 shows a MPUE 410 and a plurality of radio cells C0-C20. We assume in this example that the MPUE 410 has 4 panels P1-P4, but only one panel can be activated at a time. The MPUE 410 is located in radio cell c0 and is served by a current beam b0. The MPUE 410 is located near the radio cell edge between radio cell 0 and radio cell 8 and is moving in the direction of radio cells c8 and c9. We assume that radio cell c4 (or only its beam b4 that is detected by the MPUE 410 with its panel P2) will be switched off in e.g. 5 seconds based on the predicted network energy saving decisions. Although MPUE can detect and measure the beam b4 of radio cell c4 using the panel P2, it is not necessary to activate panel P2 anymore as the radio cell c4 will be switched off. Instead, the MPUE can perform more measurements using other panels P1, P3 and P4 to increase the measurement accuracy. Panel P1 may be used to detect beam b8 of radio cell c8, panel P4 may be used to detect beam b9 of radio cell C9 and panel P3 may be used to detect the serving beam b0 of the serving radio cell c0.

We assume that the MPUE 410 receives the predicted network energy saving decisions for the radio cells c0, c9, c8, c4. If the likelihood of the strongest beam that is measured by the UE from the radio cells c9 and c4 to be switched off in the next 10 seconds is very high (the definition of a threshold can be UE implementation specific or configured by the network), although MPUE can have measurements from the beams of the radio cell c9 and c4 using the panels P4 and P2, the activation rate of the panel P4 and P2 will be reduced. Instead, MPUE can activate the panels P3 and P1 more often to increase the measurement accuracy and to initiate the handover in a reliable manner and at the same time reduce power consumption at the UE by skipping activation of P4 and P2.

Based on this example, it appears that the panel activation strategy can be configured on the basis of the predicted network energy saving strategy received for the serving radio cell and/or for one or more adjacent radio cells that may be the target radio cell during a handover procedure.

Each panel of an antenna of a MPUE may have its own activation rates and/or be activated independently (e.g. during specific time periods) of the other panels of the same MPUE.

Figure 6:
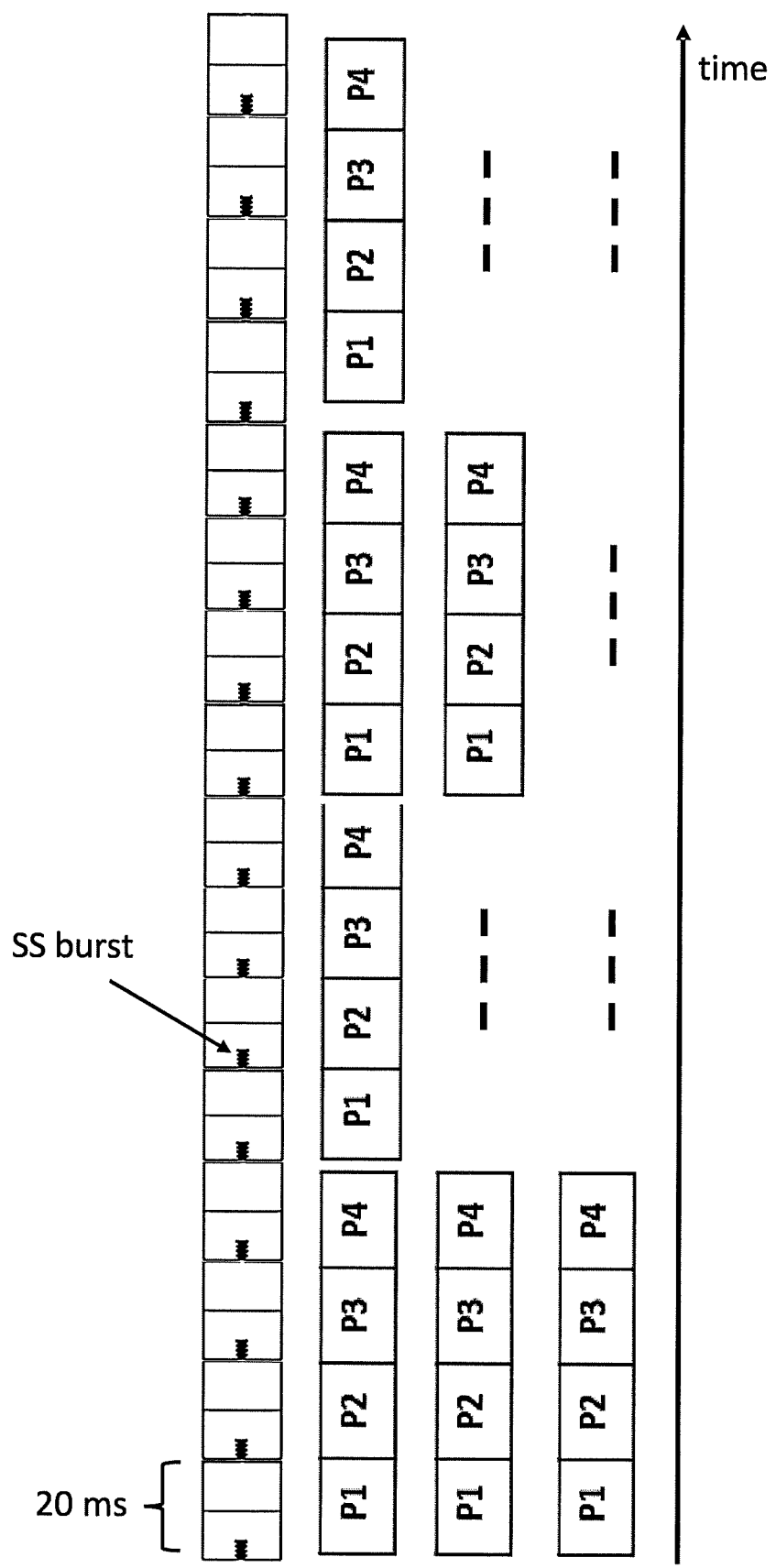
FIG. 6 presents an example of different panel activation rates corresponding to a panel activation strategy according to an example.

FIG. 6 presents an example of different panel activation rates with an SSB burst periodicity of 20 ms. In the example, four panels P1, P2, P3 P4 may be activated. The activation rate (that may be expressed as a percentage) of a panel may be defined with respect to the periodicity of reception of reference signals. The activation rate defines a sampling rate (or scanning rate, that may be expressed in seconds or ms) and a corresponding scan time during which the panel may detect a signal. The sampling rate of the measurements with the MPUE assumption 1 is $\{1/80 \text{ ms}, 1/160 \text{ ms}, 1/320 \text{ ms}\}$ for round robin activation rates of $\{1, 1/2, 1/4\}$ respectively. If the MPUE activation rate of non-serving radio cell measurements reduces further, the sampling period for one non-serving radio cell measurement can even exceed 320 ms.

The panel activation strategy may have an impact on the mobility measurements performed by a UE.

The measurement model performed by the UE for mobility measurements is specified in 3GPP TS 38.300. According to this measurement model, the UE detect and performs quality measurement for multiple beams (at least one) detected for a radio cell and the measurements results (e.g. power values) are averaged to derive the radio cell quality. In doing so, the UE may be configured to select a subset of the detected beams. Filtering takes place at two different levels: at the physical layer (L1) to derive beam quality measurements and then at RRC level (L3) to derive radio cell quality from multiple beams. Radio cell quality derived from beam measurements is derived in the same way for the serving radio cell(s) and for the non-serving radio cell(s). The concerned beams may be reference signals like SSB-RS or CSI-RS.

The UE may apply a specific implementation for L1 filtering. How and when the UE exactly performs the required measurements is implementation specific. The accuracy of the layer 1 measurements is left for UE implementation, however a certain minimum accuracy has to be guaranteed by the means of performance requirements (defined in 3GPP by RAN WG4). L1 filtering may include beam sampling and beam averaging over a set of detected beams to reduce the fluctuations in measurements caused by fast fading and measurement error. The L1 beam measurements are reported by L1 to L3 after L1 filtering with a given L1 input rate.

Layer 3 filtering includes averaging of the N strongest beams above a threshold by means of filters. The configuration of the L3 filters is provided by RRC signalling to the UE. 3GPP document TS 38.331, section 5.5.3.2 defines the layer 3 filtering procedure more precisely. Quality measurements are provided by the L3 filter at a given output rate.

In principle, the UE can select any L1 sampling rate, filter realization, or output rate as long as the minimum requirements are satisfied. But if due to the energy saving strategy of the network, one or more beams are not detected by the UE and/or if the UE does not activate a panel for detecting a transmitted beam, the L1 sampling rate or output rate may be too small and this will degrade the results of the quality measurement.

Simulations have been done to show the impact of the different L1 input rates on measurement accuracy and a stationary situation in the mathematical sense (i.e. no slow fading) is considered. The measurement accuracy is determined based on the standard deviation after L3 filtering for a given L3 filter in 3 cases:

First case: 3 samples per beam are used in L1 filtering by moving average with a UE speed of 60 km/h;
Second case: 5 samples per beam are used in L1 filtering by moving average with a UE speed of 60 km/h;
Third case: 3 samples per beam are used in L1 filtering by moving average with a UE speed of 3 km/h.

Based on the simulation results, it has been observed that the L3 filtering output gets more inaccurate (based on standard deviation of the measurements) when L3 sampling period increases, especially if L3 sampling period is higher than the L3 filter time constant. Long L3 sampling period is likely especially for MPUE-A1 as certain panels are not measured often enough due to panel activation restrictions.

On this basis, one can understand that unnecessary panel activations increase the power consumption of the MPUE and may decrease the measurement accuracy for the target radio cells and/or target reference signals for MPUE under assumption 1 since only part of the relevant target reference signals may be detected and taken into account for the quality measurement while a panel is activated for another non-relevant reference signal. Accordingly an appropriate panel activation strategy as disclosed herein is needed that prioritizes the activation of one or more panels with respect to other panels: such panel activation strategy with prioritization of at least panel is also referred herein as panel prioritization strategy.

A panel prioritization strategy may be applied during various types of inter-radio cells mobility procedures including baseline handover procedures but also other types of procedures such as Conditional Handover (CHO) that ensures robustness of the handover procedure, Dual Active Protocol Stack (DAPS) handover or an L1/2 Inter-radio cell Mobility procedure.

The main benefit of L1 inter-radio cell mobility compared to baseline handover and conditional handover is that the interruption during the handover execution can be reduced substantially as the UE does not need to perform higher layer (RRC, PDCP) reconfiguration and for some scenarios UE can perform RACH less to connect the target radio cell.

In all these inter-radio cell mobility procedures, the handover is initiated by the network configured events. Handover configuration information and/or handover instructions are provided to the UE by a network entity, e.g. in a RRC Reconfiguration message or conditional handover command. The RRC Reconfiguration message may include various types of information. The RRC Reconfiguration message or conditional handover command may also include the information related to the network energy saving strategy of the network, this information being indicative of the predicted transmissions of reference signals by one or more network nodes: this allows a UE to define an appropriate panel prioritization strategy on the basis of the information related to the energy saving strategy.

A panel prioritization strategy may be determined and applied not only during handover procedures but also during beam management procedures in which a UE has to switch from a serving beam (a first reference signal) to a target beam (a second reference signal) for a same serving radio cell. In such use cases, the information indicative of predicted transmissions of reference signals may be transmitted by the serving network node in a medium access control, MAC, control element, CE, message during the beam management procedure to determine an appropriate panel prioritization strategy based on the information indicative of predicted transmissions of reference signals.

A panel prioritization strategy may be relevant or have an impact on the management of an AI/ML Air Interface, especially with respect to beam management, e.g., beam prediction in time, and/or spatial domain for overhead and latency reduction, beam selection accuracy improvement. A panel prioritization strategy may also be relevant or have an impact various aspects like signalling procedures, measurement procedure and/or feedback procedure performed on UE side.

A method for determining a panel prioritization strategy based on the predicted network energy saving strategy received from the network is disclosed in detail. The network (e.g. a network entity) shares this strategy during mobility procedures e.g. handover preparation with the UEs as a part of the RRC Reconfiguration message. The network can activate/deactivate the reference signals e.g. SSB-RS (and the radio cells) dynamically to reduce the energy consumption at the network.

Figure 7:
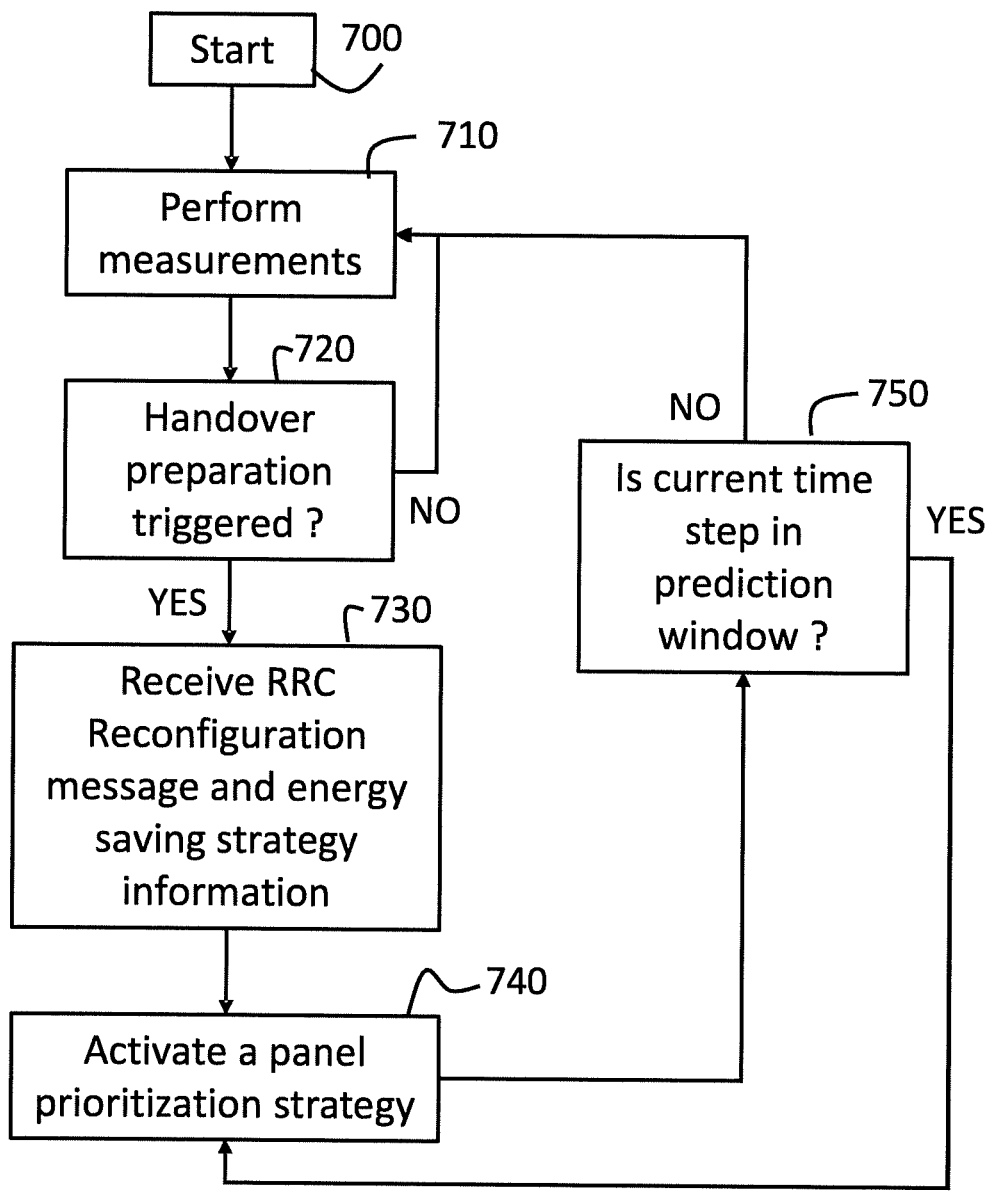
FIG. 7 shows a flowchart of a method for determining a panel prioritization strategy according to an example.

FIG. 7 shows a flowchart of a method for determining a panel prioritization strategy according to one or more example embodiments. The steps of the method may be implemented by a MPUE according to any example described herein. The function performed for a given radio cell may be performed by an associated network entity, e.g. an access node of the given radio cell.

In step 700, the method starts.

In step 710, the UE performs measurements for a serving radio cell (SC) and one or more non-serving radio cell (NSC) over time, where the one or more non-serving radio cells are potential target radio cells for an inter-cell mobility procedure.

In step 720, the UE determines whether a handover (Conditional Handover, CHO or L1/2 centric inter-radio cell mobility) preparation mechanism has to be triggered. For example, when the signal quality of the non-serving radio cell is increased such that the RSRP value for the NSC is greater than the RSRP value for the NSC (e.g. NSC>SC+ offset).

In step 730, if the handover preparation mechanism has been triggered in step 720, the source radio cell prepares the potential target radio cell(s) based on the measurements received from the UE in step 710. The serving radio cell also requests from one or more target radio cells to share the predicted energy saving strategy for their reference signals (e.g. for its SSB-RS indexes) at the time t+T, where t is the current time and T is the prediction window duration. The network energy saving model(s) used for the target radio cell(s) performs predictions concerning at least the future activation/deactivation status of the reference signals (e.g. the SSB-RS indexes) of the concerned target radio cell(s). The target radio cells share the predicted energy saving strategy in future with the serving radio cell, for example as a part of the handover acknowledgment. The serving radio cell may aggregate the predictions from various target radio cells and send the energy saving predictions to the UE (e.g. as a part of the RRC Reconfiguration message that includes the configuration of the potential target radio cells).

In step 740, when the UE receives the configuration of the potential target radio cells together with the energy saving strategy information for potential target radio cells, the UE activates a panel prioritization strategy: the UE determines and configures the panel activation rates according to a panel prioritization algorithm corresponding to a panel prioritization strategy.

A MPUE may activate more often the panels that can detect the reference signals (of a target radio cell and/or a current radio cell) that will not be (e.g. the activation/deactivation status is indicative of a deactivation) or are not likely (the probability of activation/deactivation is below a threshold) to be switched off in the near future, e.g. in the next time period.

The duration of the time period for which the UE computes the panel activation rates/panel scan times may be equal to the prediction window duration T of the network energy saving model or be adjusted based on a validity time of the inference model output. For simplicity, it is assumed here that the prediction window duration T is used as validity period for the panel activation rates determined by applying the panel prioritization algorithm.

In step 750 performed after step 740, if the current time t is in the prediction window, the UE continues to apply the same panel prioritization strategy as the one configured in previous step 740. Otherwise, step 710 is performed again after step 750 to perform new measurements.

Figure 8:
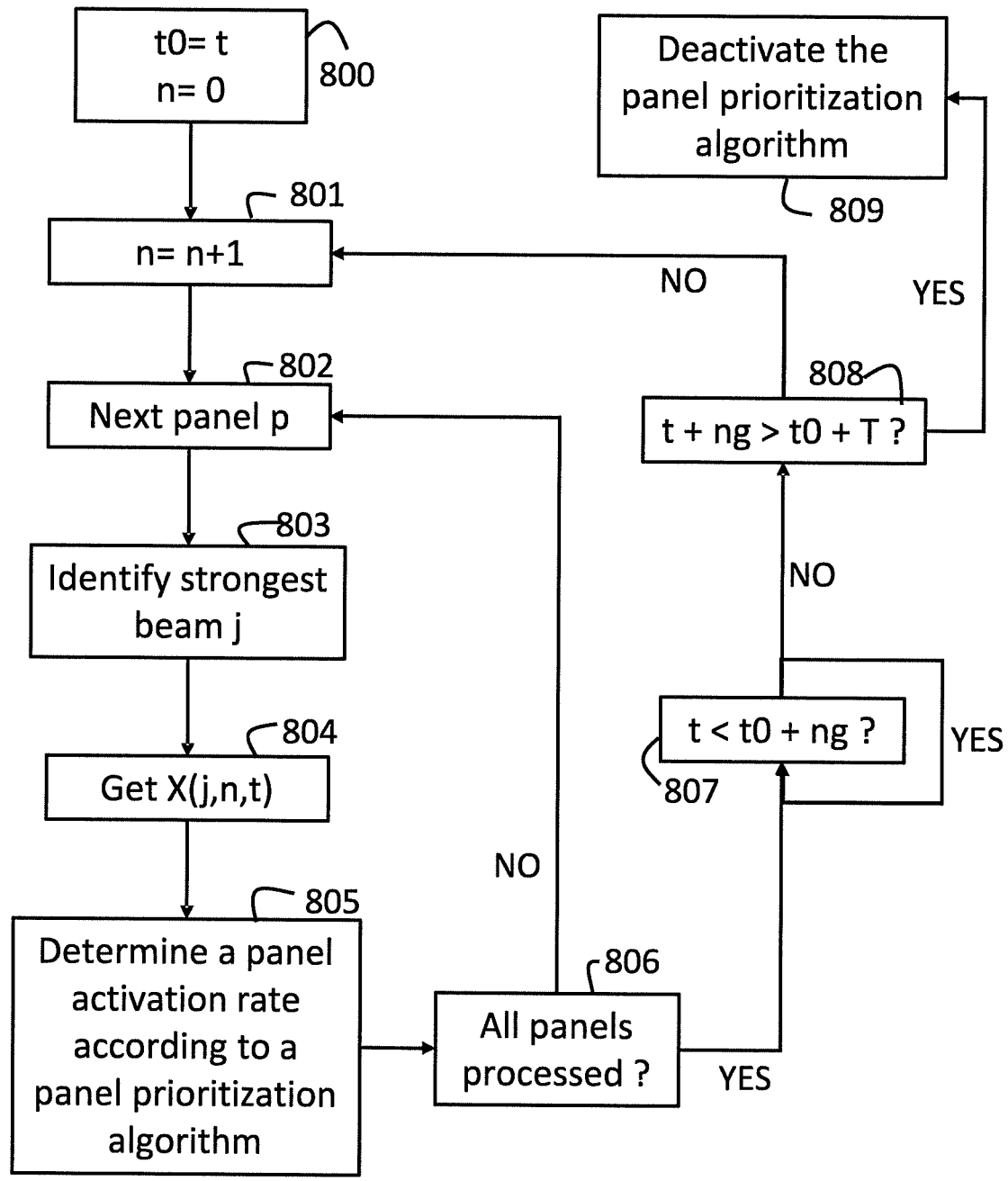
FIG. 8 shows a flowchart of a method for determining a panel prioritization strategy according to an example.

FIG. 8 shows a flowchart of a method for determining a panel prioritization strategy according to one or more example embodiments. The steps of the method may be implemented by a MPUE according to any example described herein.

In various embodiments, a network energy saving model is used to generate a plurality of values for a plurality of output parameters defining a network energy saving strategy. The network energy saving model (also referred to herein briefly as the model) is an AI/ML-based model configured to implement a network energy saving strategy and to generate as. The model may be trained using various AI/ML technologies. The inference model may be run in a NG-RAN node or another network entity.

The following information could be considered as input of the model:
UE mobility/trajectory prediction;
Current/predicted energy efficiency of itself and neighboring nodes (if available);
Current/predicted resource of itself and neighboring nodes (if available);
UE measurement reports e.g. RSRP, RSRQ, SINR measurement;
UE location information (e.g., coordinates, serving radio cell ID, moving velocity) interpreted by gNB implementation when available.

The model may generate following information as output:
Energy saving strategy, such as recommended radio cell activation/deactivation and/or information indicative of predicted transmissions of reference signals;
Handover strategy, including recommended candidate radio cells for taking over the traffic;
Predicted energy efficiency;
Predicted energy state (e.g., active, high, low, inactive);
Model output validity time.

The UE may receive information indicative of predicted transmissions of reference signals. The information indicative of predicted transmissions of reference signals may include information related to predicted transmission of one or more reference signals supported by one or more radio cells (that may include the serving radio cells and/or at least one target radio cell).

The information related to a predicted transmission of a reference signal may include an activation/deactivation status of the reference signal at a given time step or for a given time interval. The information related to a predicted transmission of a reference signal may include a probability that the reference signal be switched off/on at a given time step or for a given time interval.

The network energy saving model may for example generate for time step t+T and for each reference signal j (e.g. the SSB beam corresponding to the SSB-RS index j) of the radio cell i a value $SSB_{t+T}^{i,j}$ that represents an activation/deactivation status of the reference signal j at time step t+T, where $SSB_{t+T}^{i,j}$ may have a 1 bit value.

The network energy saving model may for example generate for time step t+T and for each reference signal j (e.g. the SSB beam corresponding to the SSB-RS index j) of the radio cell i a value $SSB_{t+T}^{i,j}$ that represents a probability that the reference signal j be switch on or off at time step t+T, where $SSB_{t+T}^{i,j}$ may be a value between 0 and 1.

The prediction may be performed for a given prediction window [t; t+T], where T is referred to herein as the prediction window duration. The prediction may be performed with a granularity g, meaning that the network energy saving model is configured to generate, for each output parameter, a temporal succession of N output values for t+ng, with n varying from 1 to N and Ng=T.

For example, the network energy saving model is configured to perform a prediction for a prediction window T=10 seconds with 1 second granularity. For example if T=1000 ms and g=100 ms, the model generates N=10 predictions for the prediction window.

The MPUE may adjust the panel activation rate/scan time of its panels based on the network energy saving strategy received for a given prediction window [t;t+T].

The network energy saving model output may be implemented as a convolutional neural network $i^{th}$ an activation function in the output layer, with or without post-processing after the output layer. The method for panel activation may depend on the type of the activation function and/or the use or not of a post-processing by the network energy saving model output.

The network energy saving model output may have several output data types that can be shared with the UE for running the panel prioritization algorithm. Let K be the total number of reference signals (e.g. total number of SSB-RS indexes) supported by a radio cell. Let g be the granularity of the prediction such that Ng=T. The following output data types may be used:

1. Type 1: a prediction is performed for the time step t+T with post processing: the network energy saving model generates, for each target radio cell i, a vector $o_{t+T}^i = [SSB_{t+T}^{i,0}, \ldots, SSB_{t+T}^{i,j}, \ldots SSB_{t+T}^{i,K}]$, in which $SSB_{t+T}^{i,j}$ represents the activation/deactivation status of the reference signal j of the radio cell i at time step t+T;

2. Type 2: a prediction is performed for the time step t+T without post processing: the network energy saving model generates, for each target radio cell i, a vector $o_{t+T}^i = [SSB_{t+T}^{i,0}, \ldots, SSB_{t+T}^{i,j}, \ldots SSB_{t+T}^{i,K}]$, in which $SSB_{t+T}^{i,j}$ represents the probability of the reference signal j to be switched off for the radio cell i at time step t+T or during time interval [t, t+T];

3. Type 3: a prediction is performed for the time step t+T with granularity and with post processing: the network energy saving model generates an output matrix $m_{t+T}^i = [o_{t+g}^i, o_{t+2g}^i, \ldots, o_{t+Ng}^i]$ where the g is the temporal granularity of the prediction, where $o_{t+g}^i = [SSB_{t+g}^{i,0}, \ldots, SSB_{t+g}^{i,j}, \ldots SSB_{t+g}^{i,K}]$ is a vector in which a component $SSB_{t+ng}^{i,j}$ represents the activation/deactivation status of the reference signal j of the radio cell i at time step t+ng or during time interval [t, t+ng], where n varies between 1 and N;

4. Type 4: a prediction is performed for the time step t+T with granularity and without post processing: the network energy saving model generates an output matrix $m_{t+T}^i = [o_{t+g}^i, o_{t+2g}^i, \ldots, o_{t+Ng}^i]$ where the g is the temporal granularity of the prediction, where $o_{t+g}^i = [SSB_{t+g}^{i,0}, \ldots, SSB_{t+g}^{i,j}, \ldots SSB_{t+g}^{i,K}]$ is a vector in which a component $SSB_{t+ng}^{i,j}$ represents the probability of the reference signal j to be switched off for the radio cell i at time step t+ng or during time interval [t, t+ng], where n varies between 1 and N;

For the output type 4, the MPUE may convert the output matrix to a single vector by deriving, based on the probabilities obtained for each time sub-interval [t, t+ng] (for n=1 to N) for each reference signal index j, a probability that the reference signal j be switched off/on during time interval [t, t+T]. The MPUE may for example multiply the probabilities to generate the probability for the time interval [t, t+T]. As a consequence, instead of adjusting the panel activation rate of each time sub-interval [t, t+ng], the MPUE derives the probability of the reference signal to be switched off/on between the time interval [t, t+T].

The method of FIG. 8 for determining a panel prioritization strategy may be executed when the UE receives information indicative of predicted transmissions of reference signals and may be used until the end of the prediction window. The method in FIG. 8 is generalized to be applicable the various output types of the network energy saving model. The method is described in an example embodiment in which the reference signals are SSB-RS beam but is likewise applicable to other types of reference signals.

Step 800: the UE receives network energy saving strategy and starts the execution a panel prioritization algorithm. Let t0 be the current time step t0=t when panel prioritization algorithm starts. Let n be a counter index of the time intervals [t0+(n−1)g; t0+ng], where n is an integer that varies between 1 and N with Ng=T (prediction window duration). If no granularity is used for the predictions, the value of g may be set to g=T and the value of N be set to N=1.

Step 801: the UE increases the counter n by 1.

Step 802: the UE selects one of the panels p for which a activation rate will be determined based on the received information indicative of predicted transmissions of reference signals.

Step 803: the UE identifies the best reference signal: for example the UE gets the index j of the strongest beam SSB-RS and the associated radio cell c for that SSB-RS index from the selected panel p.

Step 804: for the beam/radio cell pair identified in step 803 for the current panel p, the UE gets the information X(j,c,n) related to predicted transmission of the reference signal j supported by radio cell c at time step t+ng or during the time interval [t0+(n−1)g; t0+ng]. X(j,c,n) is either an activation/deactivation status of the reference signal j or a probability that the reference signal be switched off/on at time step t0+ng.

Step 805: Based on the value X(j,c,n), the UE determines the panel activation rate or scan time of the current panel p according to a panel prioritization algorithm. The UE activates the panel p more often if the strongest beam j observed from the panel p is predicted to be transmitted at time t0+ng or during the time interval [t0+(n−1)g; t0+ng].

The panel activation rate/scan time may be determined using various functions. One or more threshold values may be used to determine the panel activation rate. The threshold values may be UE implementation specific or be configured by a network entity and shared with the UE. For example, a first scan time threshold T1 may be set to 0.9. A second scan time threshold T2 may be set to 0.5.

With a MPUE under assumption 1 (only one panel can be activated at a time), the maximum scan time per panel is T1/NP, where NP is the total number of panels. If X(j,c,n)>T1, the scan time for panel p is set to ST(p)=(T1*100)/NP. For example if X(j,c,n)=1, ST(p)=30%. If T2<X(j,c,n)<=T1, the scan time for panel p may be set to a lower value. If X(j,c,n)<=T2, the panel may not be activated or the scan time is further reduced.

With a MPUE under assumption 3 (all the panels may be activated simultaneously), the maximum scan time per panel is set to T1. If X(j,c,n)>T1, the scan time for panel p is set to ST(p)=T1. For example if X(j,c,n)=1, ST(p)=90%. If T2<X(j,c,n)<=T1, the scan time for panel p may be set to ST(p)=to a lower value. If X(j,c,n)<=T2, the panel may not be activated or the scan time is further reduced.

If X(j,c,n)=0, the scan time of the panel p should be very low, e.g. 5% or even zero as the measured beam will be most likely switched off (e.g. the probability of activation is below a threshold or the activation status is indicative of a deactivation) at time t0+ng according to the received predictions.

Step 806: it is determined whether the scan time/activation rate has been adjusted for all the panels. If the response is no, steps 802 to 805 are repeated for another panel until all panels have been processed. Otherwise the method continues with the step 807.

Step 807: the MPUE checks if the current time step t falls in the time interval [t0; t0+ng]. If the response is yes, the MPUE continues to use the same activation rates/scan times determined based on the received network energy saving predictions and step 807 may be repeated until the current time step is higher than t0+ng and then executes step 808.

Step 808: if the current time step t is higher than t0+ng, the MPUE checks if t0+ng>=t0+T. Note that this step 808 is used only when N>1, for example for the model output type 3 and 4 when the network performs several predictions during the time interval [t0;t0+T]. If the condition is true, the MPUE deactivates the panel prioritization strategy as the current time step t exceeds the prediction window [t0; t0+T] of the energy saving strategy model and the UE assumes that the network predictions will not be valid anymore. Otherwise, if the condition is false, step 801 is executed again after step 808.

Figure 9:
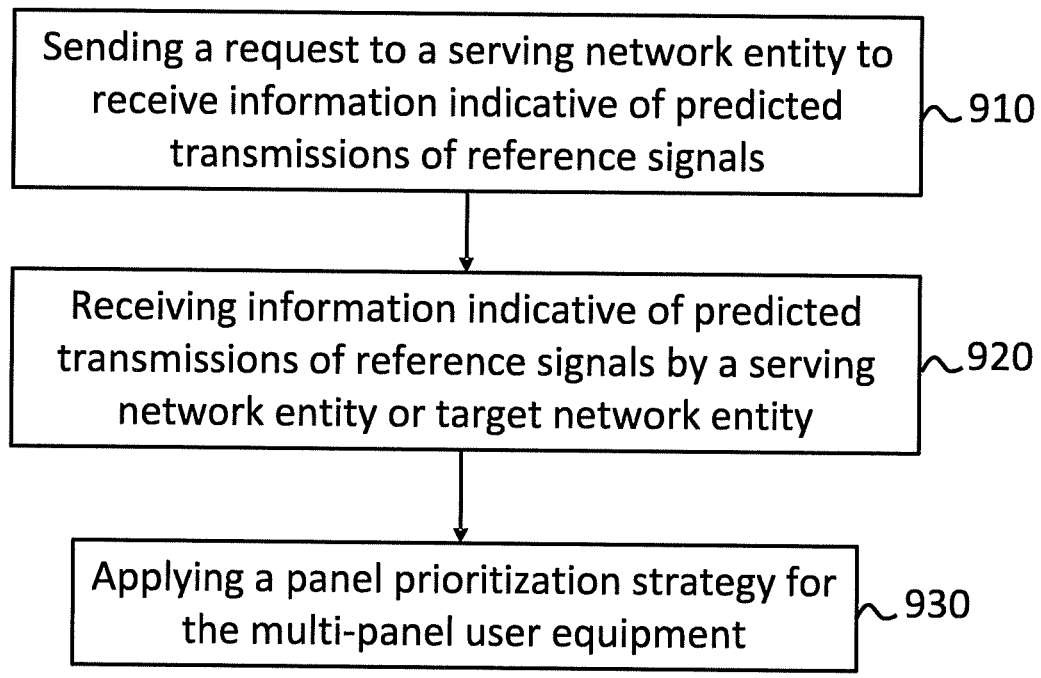
FIG. 9 shows a flowchart of a method for determining a panel prioritization strategy according to an example.

FIG. 9 shows a flowchart of a method for determining a panel prioritization strategy according to one or more example embodiments. The steps of the method may be implemented by MPUE according to any example described herein.

While the steps are described in a sequential manner, the man skilled in the art will appreciate that some steps may be omitted, combined, performed in different order and/or in parallel.

In step 910, a request may be sent to a serving network entity to receive information indicative of predicted transmissions of reference signals. The request may concern a serving radio cell and/or a target radio cell.

In step 920, information indicative of predicted transmissions of reference signals by a serving network entity or target network entity is received from the serving network entity.

The information indicative of predicted transmissions of reference signals may be received in a Radio Resource Control, RRC, reconfiguration message during an inter-radio cell mobility procedure.

The information indicative of predicted transmissions of reference signals may be received in a medium access control, MAC, control element, CE, message during a beam management procedure to switch from a serving beam corresponding to a first reference signal transmitted by the serving network entity to a target beam corresponding to a second reference signal transmitted by the serving network entity.

The information indicative of predicted transmissions of reference signals may include for each of one or more reference signals, at least one predicted activation status. An activation status may be associated with a time step or time interval for which the prediction has been performed. The information indicative of predicted transmissions of reference signals may include for each of one or more reference signals, at least one probability of transmission of a reference signal. A probability of transmission of a reference signal may be associated with a time step or time interval for which the prediction has been performed.

The information indicative of predicted transmissions of reference signals may be generated as described herein, for example by reference to FIG. 8. It may include vectors and/or matrices including predicted values (activation status or a probability of transmission) for one or more time steps and/or one or more time intervals for which the prediction has been performed.

In step 930, a panel prioritization strategy for the multi-panel user equipment is applied based on the received information indicative of predicted transmissions of reference signals.

The panel prioritization strategy may be applied for a time period included within a validity period of the received predicted energy saving strategy. Applying a panel prioritization strategy may include determining an activation rate for one or more panels.

An activation rate of a panel may be adjusted in various manners. The activation rate may be determined as described herein, for example by reference to FIG. 8.

The MPUE may activate more often the panels that can detect the reference signals (of a target radio cell and/or a current radio cell) that will not be (e.g. the activation/deactivation status is indicative of a deactivation) or are not likely (the probability of activation/deactivation is below a threshold) to be switched off in the future, e.g. during a next time period and/or at next time step.

The activation rate of a panel configured to detect a first reference signal for which the predicted activation status indicates that the first reference signal will be sent during a next time period may be higher than the activation rate of a panel configured to detect a second reference signal for which the predicted activation status indicates that the second reference signal will not be sent. The activation rate of a first panel configured to detect a first reference signal is higher than the activation rate of a second panel configured to detect a second reference signal when the probability of transmission of the first reference signal may be higher than the probability of transmission of the second reference signal. Applying a panel prioritization strategy may include: applying the activation rate to at least one panel of a plurality of panels of the multi-panel user equipment.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host apparatus or host system. The instructions may be transmitted over the computer-readable medium and be loaded onto the host apparatus or host system. The instructions are configured to cause the host apparatus or host system to perform one or more functions disclosed herein. For example, as mentioned above, according to one or more examples, at least one memory may include or store instructions, the at least one memory and the instructions may be configured to, with at least one processor, cause the host apparatus or host system to perform the one or more functions. Additionally, the processor, memory and instructions, serve as means for providing or causing performance by the host apparatus or host system of one or more functions disclosed herein.

The host apparatus or host system may be a general-purpose computer and/or computing system, a special purpose computer and/or computing system, a programmable processing apparatus and/or system, a machine, etc. The host apparatus or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 10:
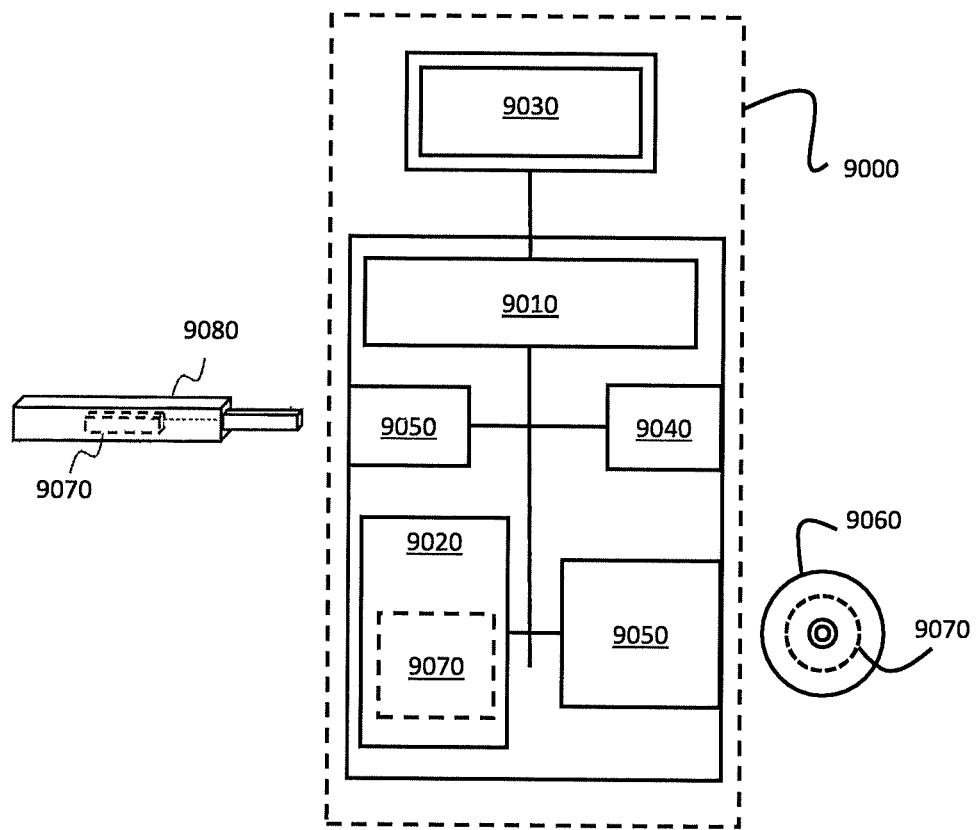
FIG. 10 is a block diagram of an apparatus according to an example.

FIG. 10 illustrates an example embodiment of an apparatus 9000. The apparatus 9000 may be a MPUE or be part of a MPUE as disclosed herein.

As represented schematically by FIG. 10, the apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host apparatus or host system to perform one or more functions disclosed herein for the host apparatus or host system.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function (s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

BB Baseband
BS Base Station
CIO Radio cell Individual Offset
CSI Channel State Information
CSI-RS Channel State Information Reference Signal
CU Centralized Unit
DU Distributed Unit
gNB gNodeB (NR base station)
HO Handover
KPI Key Performance Indicators
L1 Layer 1 (physical layer) of 5G protocol stack
L2 Layer 2 (include MAC, RLC and PDCP) of 5G protocol stack
L3 Layer 3 (RRC layer) of 5G protocol stack
LTE Long Term Evolution
MPUE Multi-panel User Equipment
MRO Mobility Robustness Optimization
NR New Radio
NWDAF Network Data Analytics Function
OAM Operation, Administration, Maintenance
RAN Radio Access Network
RAT Radio Access Technology
Rel 3GPP Release
RF Radio Frequency
RLF Radio Link Failure
SS Synchronization Signal
SSB Synchronization Signal Block
SSB-RS Synchronization Signal Block Reference Signal
TTT Time to trigger
UE User Equipment

The invention claimed is:

1. A method, comprising:
receiving, with a multi-panel user equipment from a serving network entity, information on predicted network energy saving strategy with respect to at least one of radio cell activation, radio cell deactivation, or predicted transmissions of reference signals with a serving network entity or target network entity; and
applying a panel activation strategy for the multi-panel user equipment based on the received information, wherein the panel activation strategy prioritizes the activation of one or more panels with respect to other panels.

2. A method according to claim 1, wherein the information indicative of predicted transmissions of reference signals is received in a radio resource control reconfiguration message during an inter-radio cell mobility procedure.

3. A method according to claim 1, wherein the information indicative of predicted transmissions of reference signals is received in a medium access control control element message during a beam management procedure to switch from a serving beam corresponding to a first reference signal transmitted with the serving network entity to a target beam corresponding to a second reference signal transmitted with the serving network entity.

4. A method according to claim 1, wherein applying a panel prioritization strategy includes determining an activation rate for at least one panel of a plurality of panels of the multi-panel user equipment.

5. A method according to claim 1 wherein the information includes at least one predicted activation status of a reference signal.

6. A method according to claim 1, wherein the information includes at least one probability of transmission of a reference signal.

7. A method according to claim 4, wherein the activation rate of a panel configured to detect a first reference signal for which the predicted activation status indicates that the first reference signal will be sent during a next time period is higher than the activation rate of a panel configured to detect a second reference signal for which the predicted activation status indicates that the second reference signal will not be sent.

8. A method according to claim 4, wherein the activation rate of a first panel configured to detect a first reference signal is higher than the activation rate of a second panel configured to detect a second reference signal when the probability of transmission of the first reference signal is higher than the probability of transmission of the second reference signal.

9. A method according to claim 1, wherein the panel prioritization strategy is applied for a time period included within a validity period of the received predicted network energy saving strategy.

10. The method according to claim 4, wherein applying a panel prioritization strategy includes:
applying the activation rate to at least one panel of a plurality of panels of the multi-panel user equipment.

11. The method according to claim 1 comprising, sending a request to the network entity to receive information indicative of predicted transmissions of reference signals for at least one of a serving radio cell or a target radio cell.

12. A multi-panel user equipment, comprising:
at least one processor; and
at least one non-transitory memory storing instructions that, when executed with the at least one processor, cause the multi-panel user equipment to perform:
receiving, from a serving network entity, information on predicted network energy saving strategy with respect to at least one of radio cell activation, radio cell deactivation, or predicted transmissions of reference signals with a serving network entity or target network entity; and
applying a panel activation strategy based on the received information, wherein the panel activation strategy prioritizes the activation of one or more panels with respect to other panels.

13. A non-transitory program storage device readable with an apparatus, tangibly embodying a program of instructions executable with the apparatus, to cause the apparatus to perform a method comprising:
receiving, with a multi-panel user equipment from a serving network entity, information on predicted network energy saving strategy with respect to at least one of radio cell activation, radio cell deactivation, or predicted transmissions of reference signals with a serving network entity or target network entity; and
applying a panel activation strategy for the multi-panel user equipment based on the received information indicative of predicted transmissions of reference signals, wherein the panel activation strategy prioritizes the activation of one or more panels with respect to other panels.

* * * * *